United States Patent
Franz et al.

(10) Patent No.: US 10,730,410 B2
(45) Date of Patent: Aug. 4, 2020

(54) SEAT HAVING A BACKREST ELEMENT

(71) Applicant: Bayerische Motoren Werke Aktiengesellschaft, Munich (DE)

(72) Inventors: Matthias Franz, Brannenburg (DE); Harald Lathwesen, Mauern (DE); Wolfgang Herrmann, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 25 days.

(21) Appl. No.: 16/118,948

(22) Filed: Aug. 31, 2018

(65) Prior Publication Data
US 2018/0370390 A1 Dec. 27, 2018

Related U.S. Application Data

(63) Continuation of application No. PCT/EP2017/054025, filed on Feb. 22, 2017.

(30) Foreign Application Priority Data

Mar. 3, 2016 (DE) .................... 10 2016 203 540

(51) Int. Cl.
| | | |
|---|---|---|
| *B60N 2/02* | (2006.01) | |
| *B60N 2/20* | (2006.01) | |
| *B60N 2/30* | (2006.01) | |
| *B60N 2/14* | (2006.01) | |
| *B60N 2/34* | (2006.01) | |
| *B60N 2/90* | (2018.01) | |

(Continued)

(52) U.S. Cl.
CPC .............. *B60N 2/203* (2013.01); *A47C 7/407* (2013.01); *A47C 7/74* (2013.01); *B60N 2/0292* (2013.01); *B60N 2/143* (2013.01); *B60N 2/2227* (2013.01); *B60N 2/3031* (2013.01); *B60N 2/34* (2013.01); *B60N 2/976* (2018.02)

(58) Field of Classification Search
CPC ...... B60N 2/3081; B60N 2/34; B60N 2/3011; B60N 2/753
See application file for complete search history.

(56) References Cited

U.S. PATENT DOCUMENTS

| | | | |
|---|---|---|---|
| 3,313,570 A | 4/1967 | McVeigh | |
| 3,784,989 A * | 1/1974 | LeGrand | ................ A47C 17/80 5/9.1 |

(Continued)

FOREIGN PATENT DOCUMENTS

| | | |
|---|---|---|
| CN | 105102262 A | 11/2015 |
| DE | 1 998 397 U | 12/1968 |

(Continued)

OTHER PUBLICATIONS

International Search Report (PCT/ISA/210) issued in PCT Application No. PCT/EP2017/054025 dated Apr. 28, 2017 with English translation (seven pages).

(Continued)

*Primary Examiner* — Shin H Kim
(74) *Attorney, Agent, or Firm* — Crowell & Moring LLP

(57) ABSTRACT

A seat has a seat surface element and a first backrest element. The first backrest element can be pivoted from a use position into a stowed position under the seat surface element. The first backrest element can be pivoted under the seat surface element in a guided or optionally in a forcibly guided manner.

19 Claims, 2 Drawing Sheets

(51) Int. Cl.
*A47C 7/40* (2006.01)
*A47C 7/74* (2006.01)
*B60N 2/22* (2006.01)

(56) References Cited

U.S. PATENT DOCUMENTS

| | | | |
|---|---|---|---|
| 5,641,202 A | 6/1997 | Rus | |
| 5,658,046 A * | 8/1997 | Rus ..................... | B60N 2/3013 16/4 |
| 5,868,467 A * | 2/1999 | Moll ..................... | A47C 1/032 297/316 |
| 5,911,471 A * | 6/1999 | Benedict .............. | B60N 2/3011 297/158.1 |
| 5,934,732 A * | 8/1999 | Jakubiec .............. | B60N 2/3013 296/65.01 |
| 6,199,951 B1 * | 3/2001 | Zeile .................... | B60N 2/3011 297/15 |
| 6,231,101 B1 | 5/2001 | Kamida et al. | |
| 6,318,784 B2 * | 11/2001 | Nishide ................ | B60N 2/3011 296/65.09 |
| 7,201,425 B2 * | 4/2007 | Tsujibayashi ...... | B60N 2/01583 296/65.05 |
| 7,252,320 B2 * | 8/2007 | Tsujibayashi ...... | B60N 2/01583 296/65.05 |
| 7,458,599 B2 * | 12/2008 | Kassai ................... | B62B 7/123 280/642 |
| 8,465,096 B2 * | 6/2013 | Sayama ............... | B60N 2/3011 297/378.14 |
| 8,926,007 B2 * | 1/2015 | Sayama ............... | B60N 2/01583 297/15 |
| 10,328,826 B2 * | 6/2019 | Ramachandra ...... | B60N 2/1615 |
| 2004/0169404 A1 * | 9/2004 | Imajo ................... | B60N 2/3011 297/15 |
| 2005/0040689 A1 * | 2/2005 | Henning .............. | B60N 2/3031 297/354.13 |
| 2006/0066123 A1 * | 3/2006 | Tsujibayashi ...... | B60N 2/01583 296/65.09 |
| 2006/0066144 A1 * | 3/2006 | Tsujibayashi ...... | B60N 2/01583 297/378.14 |
| 2009/0322133 A1 * | 12/2009 | Yamada ............... | B60N 2/3011 297/284.9 |
| 2010/0084899 A1 * | 4/2010 | Wieclawski ......... | B60N 2/2222 297/232 |
| 2011/0062738 A1 | 3/2011 | Lindley et al. | |
| 2013/0307307 A1 * | 11/2013 | Muller ................. | B60N 2/2245 297/354.12 |
| 2016/0039316 A1 | 2/2016 | Dill et al. | |
| 2017/0080831 A1 * | 3/2017 | Kaemmerer ......... | B60N 2/0224 |
| 2017/0240068 A1 * | 8/2017 | Ramachandra ...... | B60N 2/1615 |

FOREIGN PATENT DOCUMENTS

| | | |
|---|---|---|
| DE | 10 2006 047 517 A1 | 4/2008 |
| DE | 10 2007 053 958 A1 | 8/2008 |
| EP | 0 679 550 A1 | 11/1995 |
| EP | 1 400 400 A2 | 3/2004 |
| FR | 2 885 852 A1 | 11/2006 |
| WO | WO 02/14104 A1 | 2/2002 |

OTHER PUBLICATIONS

German-language Written Opinion (PCT/ISA/237) issued in PCT Application No. PCT/EP2017/054025 dated Apr. 28, 2017 (five pages).

German-language Search Report issued in counterpart German Application No. 10 2016 203 540.1 dated Sep. 28, 2016 with partial English translation (13 pages).

English translation of Chinese-language Office Action issued in counterpart Chinese Application No. 201780004675.5 dated Dec. 19, 2019 (six (6) pages).

* cited by examiner

SEAT HAVING A BACKREST ELEMENT

CROSS REFERENCE TO RELATED APPLICATIONS

This application is a continuation of PCT International Application No. PCT/EP2017/054025, filed Feb. 22, 2017, which claims priority under 35 U.S.C. § 119 from German Patent Application No. 10 2016 203 540.1, filed Mar. 3, 2016, the entire disclosures of which are herein expressly incorporated by reference.

BACKGROUND AND SUMMARY OF THE INVENTION

The present invention relates to a seat having a backrest element, in particular for a motor vehicle, and preferably for a motor vehicle with a variable interior space.

Previously known, for example, is a motor vehicle which has a pivotable backrest. For the purpose of adjusting or increasing an interior space, the backrest can be pivoted on a seat surface, for example, in order to be able to transport long objects, for example, in the motor vehicle.

It is further known in respect of motor vehicles for a motor vehicle seat to be removable by a user without tools for reasons of the variability of an interior space.

It is also previously known, furthermore, for a seat to be rotated, for example, from a position facing in the direction of driving into another position. This has a known application, for example, in so-called mobile homes or other motor vehicles with camping equipment.

However, the rotation of a seat frequently encounters the problem, in particular in passenger vehicles with limited space in their interior, that too little room is available for pivoting or rotation of the seat, and rotation of the seat is impeded, for example, by a body pillar or a center console or the like.

The object of the present invention is to make available a seat with a backrest, wherein the seat can be transferred into another seat position under conditions of limited room.

This and other objects are achieved according to the invention by a seat having a seat surface element and a first backrest element, wherein the first backrest element is pivotable in a guided manner from a use position into a stowed position underneath the seat surface element.

An inventive seat has a seat surface element and at least one backrest element, i.e. a first backrest element. The first backrest element can be pivoted in a guided manner from a use position into a stowed position underneath the seat surface element. In particular, the first backrest element can be pivoted underneath the seat surface element in a guided manner or, where appropriate, in a forcibly guided manner.

In this way, a person on the seat surface element can also take up a position in another direction, in particular in an opposite direction on the seat, in particular on the seat surface element, without the first backrest element being in the way. Furthermore, the first backrest element is capable of being stowed appropriately in this way so that it does not restrict a space.

According to a preferred further development, the first backrest element can be pivoted via a multiple-joint bearing. The multiple joint bearing can be a four-joint bearing, for example.

The first backrest element can also be pivotable via a sliding block guide, however.

As a result, by means of the multiple-joint bearing and/or the sliding block guide, the backrest element can be displaced in a guided manner from the use position into the stowed position via a defined movement path.

The first backrest element preferably has a lower section, which is adjacent to the seat surface element in the use position. In addition, the backrest element has an upper section, which is displaceably supported on the lower section.

The upper section can be a headrest, for example, or the upper section can exhibit at least the headrest.

The first backrest element can be ergonomically adaptable via the displaceable support.

According to a preferred further development of the seat with the first backrest element, which has a lower section and an upper section, the upper section in the stowed position can be displaced or can be capable of being displaced in the direction of the lower section in such a way that the first backrest element has a shorter, i.e. a shortened, length, in particular a minimal length. In this case, the upper section can be displaceable if the first backrest element is already in the stowed position, or the upper section can be displaceable before the backrest element is transferred into the stowed position.

The shorter length makes it easier to stow the first backrest element underneath the seat surface element so that it does not protrude on one side of the seat surface element.

At the same time, the first backrest element can be arranged horizontally in the stowed position underneath the seat surface element or also at an angle underneath the seat surface element. An angled arrangement enables the first backrest element to be of longer configuration or the seat surface element to be of shorter configuration.

The seat surface element as a whole or a seat surface on the seat surface element is preferably rotatably supported.

This makes it possible for a person seated on the seat to change his sitting position easily, i.e. his sitting direction, without arising from the seat.

As a result, the seat surface element can be embodied in such a way that unlocking of the first backrest element is effected by rotation of the seat surface element or the seat surface, such that the first backrest element is capable of being pivoted from the use position or the stowed position into the respective other position.

The rotatable seat surface element or the rotatable seat surface can also be connected to a pivoting mechanism of the first backrest element in such a way that pivoting of the first backrest element from the use position or the stowed position into the respective other position is driven by the rotation of the seat surface element or the seat surface.

The first backrest element in the use position can preferably be adjustable at an inclination, and in particular can be capable of being pivoted about an axis of rotation.

As a result of this, a sitting position can be varied and adapted ergonomically.

In particular, the first backrest element in the use position can be adjustable into an essentially horizontal position, wherein the first backrest is able, in addition, to form an essentially horizontal surface together with the seat surface element.

As a result, the first backrest element together with the seat surface element is able to form a reclining surface for a person or a transport surface for objects.

A locking device can be provided, in addition, which locks the backrest element in the use position and/or the stowed position.

Furthermore, the first backrest element is capable of being pivoted manually or by use of a drive mechanism between the use position and the stowed position. The drive can be effected, for example, by mechanical, electromechanical, hydraulic, pneumatic or similar devices.

According to a preferred further development of the inventive seat, the first backrest is capable of being pivoted underneath the seat surface element onto the opposite side of the seat surface element into a further use position, i.e. a second use position. This means that the backrest is capable of being pivoted over a pivot path which runs underneath the seat surface element.

In other words, a sitting direction of the seat can be varied by 180° in this way by pivoting the first backrest element, without being obliged to rotate the entire seat. Furthermore, a person who is seated on the seat surface element can remain on the seat surface element during the pivoting process, in which case the person turns appropriately or is able to turn appropriately on the seat surface element.

As an alternative hereto, the inventive seat can have in addition a second backrest element, which is capable of being pivoted in the opposite direction to the first backrest element from a stowed position underneath the seat surface element into a use position opposite the use position of the first backrest element. In other words, the second backrest element is stowed underneath the seat surface element when the first backrest element is in its use position, and the first backrest element is stowed underneath the seat surface element when the second backrest element is in its use position.

This alternative also enables a sitting direction of the seat to be varied by 180°, without being obliged to rotate the entire seat. In addition, a person who is sitting on the seat surface element can remain on the seat surface element during the pivoting process, in which case the person turns appropriately on the seat surface element.

Pivoting of the first backrest element and the second backrest element between the use position and the stowed position is preferably interconnected.

Pivoting of the first backrest element or the second backrest element thus causes opposite pivoting of the respective other backrest element in the other direction.

According to a preferred further development, the second backrest element is capable of being pivoted via a multiple-joint bearing. The multiple-joint bearing can be a four-joint bearing, for example.

The second backrest element can also be capable of being pivoted via a sliding block guide, however.

As a result, the backrest element can be displaced by way of the multiple-joint bearing and/or the sliding block guide in a guided manner from the use position into the stowed position via a defined movement path.

The second backrest element preferably has a lower section which is adjacent to the seat surface element in the use position. In addition, the second backrest element has an upper section which is displaceably supported on the lower section.

The upper section can be a headrest, for example, or the upper section can exhibit at least the headrest.

The second backrest element can be ergonomically adaptable by the displaceable support.

According to a preferred further development of the seat with the second backrest element, which has a lower section and an upper section, the upper section in the stowed position can be displaced or can be capable of being displaced in the direction of the lower section in such a way that the second backrest element has a shorter, i.e. a shortened, length, in particular a minimal length. In this case, the upper section can be displaceable if the second backrest element is already in the stowed position, or the upper section can be displaceable before the second backrest element is transferred into the stowed position.

The shorter length makes it easier to stow the second backrest element underneath the seat surface element so that it does not protrude on one side of the sear surface element.

At the same time, the second backrest element can be arranged horizontally in the stowed position underneath the seat surface element or also at an angle underneath the seat surface element. An angled arrangement enables the second backrest element to be of longer configuration or the seat surface element to be of shorter configuration.

Like the first backrest element, the second backrest element in the use position can be adjustable at an inclination, and in particular can be capable of being pivoted about an axis of rotation.

In particular, the second backrest element in the use position can be adjustable into an essentially horizontal position, wherein the second backrest can, in addition, form an essentially horizontal surface together with the seat surface element.

As a result, the second backrest element together with the seat surface element can form a reclining surface for a person or a transport surface for objects.

A particularly long reclining surface for a person can be formed if both the first backrest element and the second backrest element are adjustable into an essentially horizontal position.

Like the first backrest element, a locking device can be provided, in addition, which locks the second backrest element in the use position and/or the stowed position.

Also, as in the case of the first backrest element, the second backrest element is capable of being pivoted manually or by means of a drive mechanism, for example, by mechanical, electromechanical, hydraulic, pneumatic or similar devices, between the use position and the stowed position.

In the case of the seat with the first backrest element and the second backrest element, a locking device can be provided, which locks the first backrest element and the second backrest element between a use position and a stowed position.

As a result of this, the seat is accessible from both sides of the backrests and is particularly suitable for the fitment of a child's seat on the seat surface element.

In the case of the seat with the first backrest element and the second backrest element, these can be of different configuration one from the other. In particular, the first backrest element and the second backrest element can have a different geometrical form. Furthermore, the first backrest element and the second backrest element can have different upholstery, for example comfort-oriented upholstery and holding-oriented upholstery (in a seat for a vehicle, upholstery which is more driving-oriented). In addition, the first backrest element and the second backrest element can be of different configuration in respect of a covering layer, for example in respect of a material. Also, the first backrest element and the second backrest element can be of different configuration one from the other in respect of a comfort function.

According to a preferred further development, the first backrest element and/or the second backrest element has/have at least one adjustable comfort function. The adjustable comfort function can have a body stabilizing function, such as a seat width adjustment or a variable lumbar support, and/or a massage function and/or a seat air conditioning function, for example heating and/or cooling.

The first backrest element and/or the second backrest element is also capable of displacement from the stowed position into a leg support and/or foot support position.

The inventive seat can find an application in particular in a vehicle or a motor vehicle. The vehicle can be a watercraft or an aircraft or a land vehicle. The land vehicle can be a rail vehicle or a road vehicle. The road vehicle can be a passenger vehicle or a goods vehicle or a motor home, for example, i.e. a vehicle with living equipment or camping equipment.

The vehicle can preferably be an autonomously driven vehicle, in which the seat with the first backrest element or the seat with the first backrest element and the second backrest element is capable of being transferred from a driving-oriented position into a non-driving-oriented position.

The change of position in this case can take place during a journey by the autonomously driven vehicle without a person who is seated on the seat being required to arise completely from the seat.

The above-mentioned further developments of the invention can be combined with one another to the extent that this is possible and appropriate.

Other objects, advantages and novel features of the present invention will become apparent from the following detailed description of one or more preferred embodiments when considered in conjunction with the accompanying drawings.

DETAILED DESCRIPTION OF THE DRAWINGS

There now follows a detailed description of an illustrative embodiment of the present invention with reference to FIGS. 1 to 6.

Figure 1:
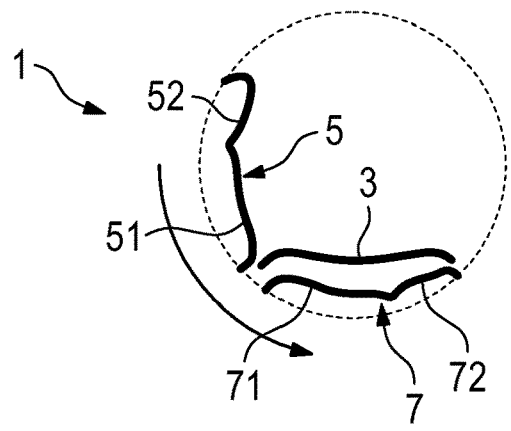
FIG. 1 is a schematic side view of a seat according to one illustrative embodiment of the present invention in a first seat position.

As depicted in FIG. 1, a seat 1 according to the illustrative embodiment of the present invention has a seat surface element 3 and a first backrest element 5. The first backrest element 5 is in a use position, such that a person seated on the seat 1 is able to sit on the seat surface element 3 and is able to rest against the backrest element 5.

The seat 1 further exhibits a second backrest element 7, which is present in a stowed position underneath the seat surface element 3.

The first backrest element 5 has a lower section 51 and an upper section 52. The upper section 52 has a headrest and is displaceably supported in relation to the lower section 51.

The second backrest element 7 also has a lower section 71 and an upper section 72, wherein the upper section 72 has a headrest and is displaceably supported in relation to the lower section 71.

As indicated in FIG. 1 by a directional arrow, the first backrest element 5 and the second backrest element 7 are capable of being displaced. For this purpose, both the first backrest element 5 and the second backrest element 7 are each displaceably supported, for example via a four-joint bearing. In addition, the bearing mechanisms of the first backrest element 5 and the second backrest element 7 are connected to one another.

If the first backrest element 5 is now pivoted or displaced in the direction of the arrow from the use position into the stowed position, the second backrest element 7 is displaced from its stowed position into the use position.

Figure 2:
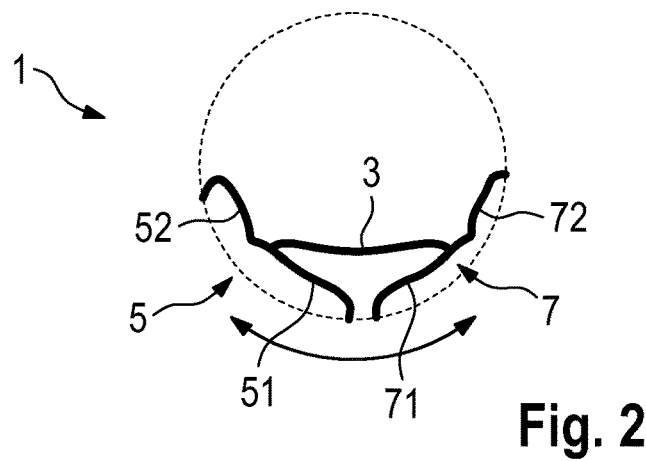
FIG. 2 is a side view of the seat according to the illustrative embodiment of the present invention in an intermediate position.

An intermediate position between the stowed position and the use position of the two backrest elements 5 and 7 is depicted in FIG. 2. This intermediate position is suitable for the fitment of a child's seat on the seat surface element 3, for example in a vehicle application. The child's seat in this case is easily accessible, both on the side of the first backrest element 5 and on the side of the second backrest element 7, with the result that the care of a child seated on the child's seat is facilitated.

Figure 3:
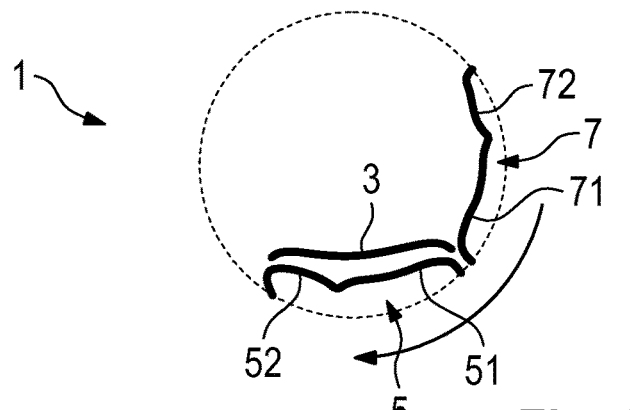
FIG. 3 is a schematic side view of the seat according to the illustrative embodiment of the present invention in a second, opposite seat position.

Depicted in FIG. 3 is the situation, in which the second backrest element 7 is present completely in its use position, and the first backrest element 5 is present in the stowed position underneath the seat surface element 3. A directional arrow indicates a direction, in which the second backrest element 7 is capable of being transferred from its use position into a stowed position.

A pivot path of the first backrest element 5 and the second backrest element 7 is indicated in the figures by a dashed circle. The pivot path must not necessarily be circular, however, but will depend on the nature of the support of the first backrest element 5 and the second backrest element 7.

Both the first backrest element 5 and the second backrest element 7 are capable of adjustment in their inclination about an axis of rotation, corresponding to a backrest inclination adjustment in previously disclosed seats.

Figure 4:
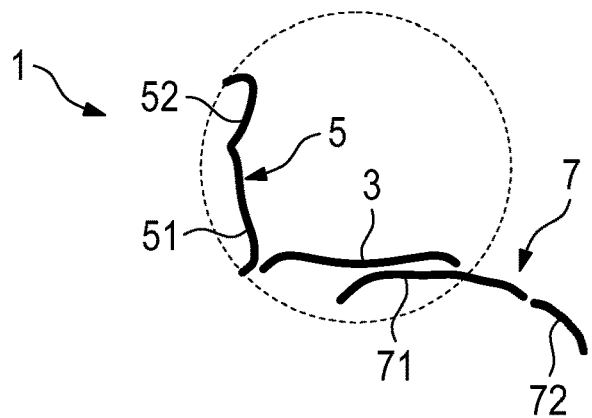
FIG. 4 is a schematic side view of the seat according to the illustrative embodiment of the present invention in a comfort position of the second seat position.
Figure 5:
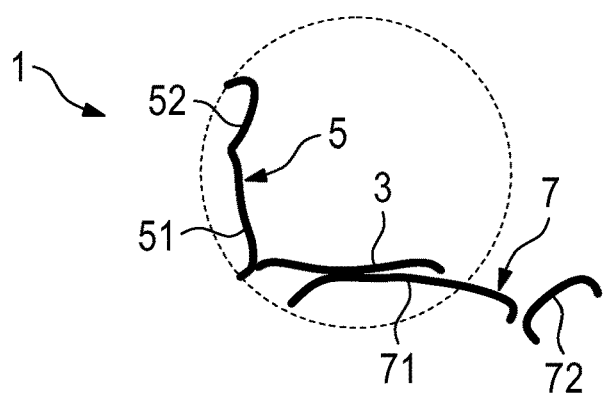
FIG. 5 is a schematic side view of the seat according to the illustrative embodiment of the present invention in a further comfort position of the second seat position.

Depicted in FIG. 4 is a situation of the seat 1, in which the first backrest element 5 is in its use position. The second backrest element 7 has also been pivoted or displaced from its stowed position into a comfort position, in particular a leg support position. In the comfort position, the second backrest element 7, and in particular the upper section 72 of the second backrest element 7, can function as a footrest by being caused to pivot, as depicted on FIG. 5.

Figure 6:
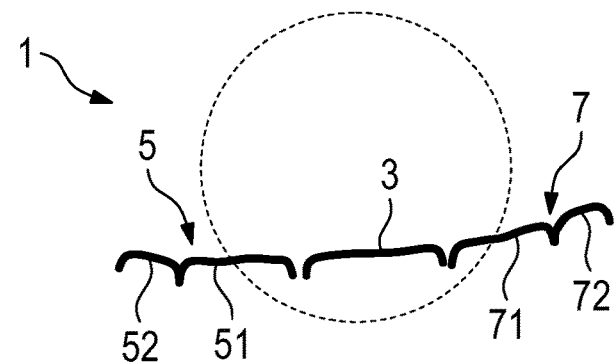
FIG. 6 is a schematic side view of the seat according to the illustrative embodiment of the present invention in a third seat position.

Depicted in FIG. 6 is a further seat position, in which the first backrest element 5 and the second backrest element 7 have been pivoted via the seat inclination adjustment from the use position, i.e. the use position for a seated person, into a horizontal reclined position, which represents a further use position. In this case, the first backrest element 5, the seat surface element 3 and the second backrest element 7 form an essentially horizontal, level surface, which is highly suitable as a reclining surface for a person or as a transport surface for objects.

The seat according to the illustrative embodiment is particularly suitable for a vehicle or a motor vehicle with a variably configured interior space. A seat position can be easily varied by 180° about its vertical axis in this way without rotating the entire seat 1. For example the seat 1, which is present in a motor vehicle in a seat position facing in the direction of driving, can be transferred into a seat position facing away from the direction of driving by pivoting the first backrest element 5 and the second backrest element 7 in opposite directions. This is particularly advantageous if the complete pivoting of a seat about its vertical axis with a backrest in an upright use position is not possible for reasons of installation space. A further major advantage is that, in the inventive solution, a person who is seated on the seat 1 is not required to stand up, but must only rotate himself on the seat surface 3 by 180° about its vertical axis. During this rotation, the person can actuate the pivoting mechanism of the first backrest element 5 and the second backrest element 7.

The first backrest element 5 and the second backrest element 7 are thus able to offer all the comfort functions that are known in the prior art. In addition, the first backrest element 5 and the second backrest element 7 can differ in respect of their design, for example so that the first backrest element 5 is of a more comfort-oriented or rest-oriented configuration, while the second backrest element 7 is of a more driving-oriented configuration.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A seat, comprising:
a seat surface element;
a first backrest element, wherein
the first backrest element is pivotable in a guided manner from a use position into a stowed position underneath the seat surface element, wherein
the first backrest element is pivotable via a multiple-joint bearing, or via a sliding block guide.

2. The seat as claimed in claim 1, wherein the multiple joint bearing is a four-joint bearing.

3. A seat, comprising:
a seat surface element;
a first backrest element, wherein
the first backrest element is pivotable in a guided manner from a use position into a stowed position underneath the seat surface element, wherein
the first backrest element has a lower section, which is adjacent to the seat surface element in the use position, and an upper section, and
the upper section is displaceably supported on the lower section.

4. The seat as claimed in claim 3, wherein
the upper section comprises a headrest.

5. The seat as claimed in claim 3, wherein
the upper section in the stowed position is displaced in the direction of the lower section such that the first backrest element has a shortened length.

6. The seat as claimed in claim 1, wherein
the seat surface element or a seat surface on the seat surface element is rotatably supported.

7. The seat as claimed in claim 6, wherein
the seat surface element is configured such that unlocking of the first backrest element is effected by rotation of the seat surface element or the seat surface, such that the first backrest element is capable of being pivoted from the use position or the stowed position into the respective other position.

8. A seat, comprising:
a seat surface element;
a first backrest element, wherein
the first backrest element is pivotable in a guided manner from a use position into a stowed position underneath the seat surface element, wherein
the first backrest element is capable of being pivoted underneath the seat surface element onto the opposite side of the seat surface element into a second use position.

9. A seat, comprising:
a seat surface element;
a first backrest element, wherein
the first backrest element is pivotable in a guided manner from a use position into a stowed position underneath the seat surface element, wherein
a second backrest element, which is pivotable in the opposite direction to the first backrest element from a stowed position underneath the seat surface element into a use position opposite the use position of the first backrest element.

10. The seat as claimed in claim 9, wherein
the second backrest element is capable of being pivoted via a multiple-joint bearing, or via a sliding block guide.

11. The seat as claimed in claim 9, wherein
the second backrest element has a lower section, which is adjacent to the seat surface element in the use position, and an upper section, and
the upper section is displaceably supported on the lower section.

12. The seat as claimed in claim 11, wherein
the upper section comprises a headrest.

13. The seat as claimed in claim 11, wherein
the upper section in the stowed position is displaced in the direction of the lower section such that the second backrest element has a short length.

14. The seat as claimed in claim 9, wherein
the first backrest element and the second backrest element are of different configuration from one another with regard to a geometrical form, an upholstery, a reference plane and/or a comfort function.

15. The seat as claimed in claim 9, wherein
the first backrest element and/or the second backrest element has at least one adjustable comfort function.

16. The seat as claimed in claim 15, wherein
the adjustable comfort function is one of: a body stabilizing function, a massage function or a seat air conditioning function.

17. The seat as claimed in claim 9, wherein
the first backrest element and/or the second backrest element is capable of displacement from the stowed position into a leg support and/or foot support position.

18. A vehicle, comprising a seat as claimed claim 1.

19. The vehicle as claimed in claim 18, wherein the vehicle is one of: a watercraft, an aircraft, a rail vehicle, a passenger vehicle, a goods vehicle, a motor home, or an autonomously driven vehicle.

* * * * *